Jan. 16, 1951     O. G. HILDEBRAND ET AL     2,538,196
ELECTRIC FAN

Filed Nov. 22, 1947     3 Sheets-Sheet 1

INVENTOR.
OTTO G. HILDEBRAND
BY MARION W. HUMPHREYS

Kwis, Hudson, Boughton & Williams
ATTORNEYS

Jan. 16, 1951　　　O. G. HILDEBRAND ET AL　　　2,538,196
ELECTRIC FAN

Filed Nov. 22, 1947　　　　　　　　　　　　3 Sheets-Sheet 2

INVENTOR.
OTTO G. HILDEBRAND
BY MARION W. HUMPHREYS

Kwis, Hudson, Boughton & Williams
ATTORNEYS

Jan. 16, 1951   O. G. HILDEBRAND ET AL   2,538,196
ELECTRIC FAN
Filed Nov. 22, 1947   3 Sheets-Sheet 3
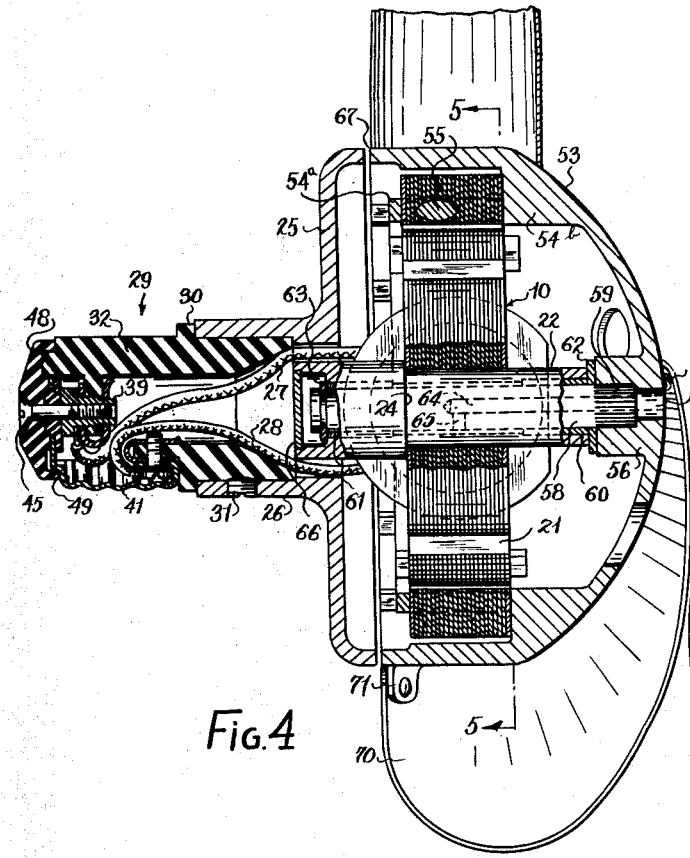
Fig.4
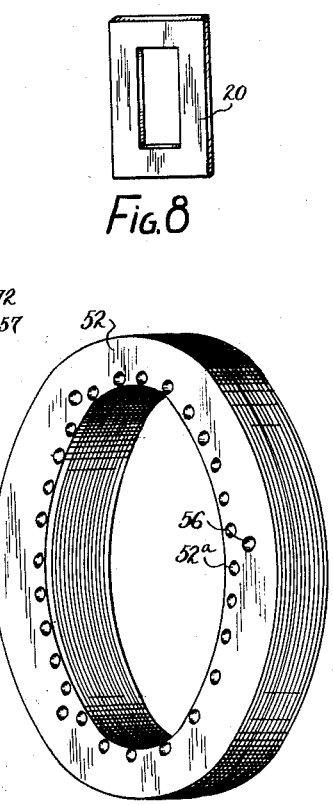
Fig.8
Fig.6
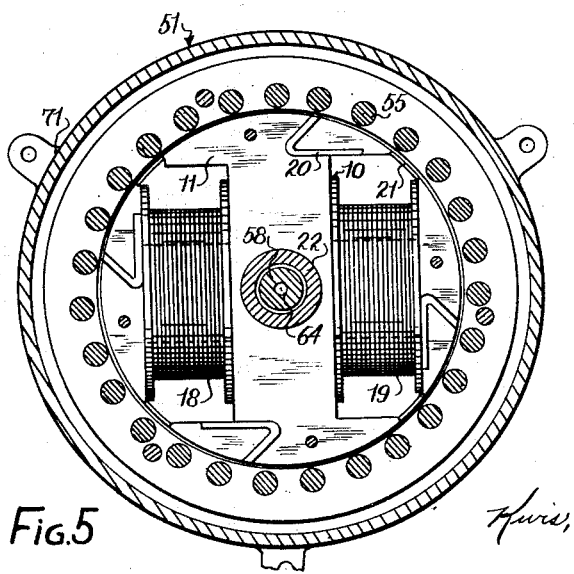
Fig.5
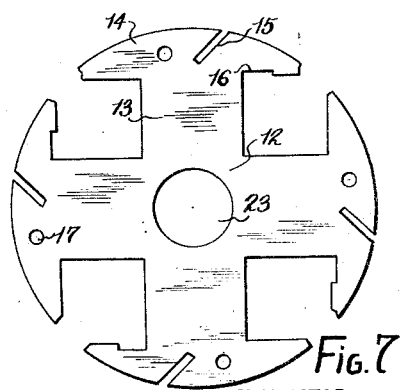
Fig.7
INVENTOR.
OTTO G. HILDEBRAND
BY MARION W. HUMPHREYS
Kwis, Hudson, Boughton & Williams
ATTORNEYS Patented Jan. 16, 1951

2,538,196

UNITED STATES PATENT OFFICE 2,538,196

ELECTRIC FAN

Otto G. Hildebrand, Brecksville, and Marion W. Humphreys, Euclid, Ohio; said Humphreys assignor to said Hildebrand Application November 22, 1947, Serial No. 787,548

2 Claims. (Cl. 230—259)

This invention relates to an electric fan and, more particularly, to an electric fan adapted to be directly connected in and supported by a standard, screw-type, electrical socket.

A principal object of the invention is the provision of novel and improved electric motor for a fan, which motor comprises a stator core having a rotor journalled thereon, which rotor is of such form that it surrounds the stator and one end of the core and provides a mounting structure for fan blades, the core having a tubular end portion attachable to a support and into which portion the lead wires for the stator extend for connection with a power source.

Another object of the invention is the provision of an electric motor of novel and improved structure for a fan, which motor comprises, a stator core structure having an electrical contact carrying tubular portion attachable to a standard electric light socket and which portion has an opening in one side thereof, and terminal connections accessible through the opening for connecting the lead wires of the stator with the contacts on the tubular portion, one of the contacts comprising a sheet metal closure for the opening, which closure has thread segments formed therein for cooperation with the threads of the light socket to retain the tubular portion in the socket and to make an electrical connection therewith.

A further object of the invention is the provision of a novel and improved electric motor for a fan, which motor comprises a stator core having a tubular support adapted to extend into an electric light socket and which support has two terminal structures therein for connecting the lead wires of the stator to contactors on the support, which terminals are accessible through an opening in the side of the support portion and which opening is closable by a sheet metal contactor electrically and mechanically connected at one end to one terminal structure and mechanically secure at the other end with the other of the terminal structures.

An object of the invention is to provide an improved electric fan which is attractive in appearance, relatively inexpensive to manufacture and which is adapted to be connected in and supported by a standard, screw-type, electrical socket, for example, a lamp socket, so that a separate base and external connecting wires are not necessary.

The invention further resides in certain novel features of construction and combinations and arrangements of parts, and further objects and advantages thereof will be apparent to those skilled in the art to which it pertains from the following description of the present preferred embodiment thereof, described with reference to the accompanying drawings in which similar reference characters represent corresponding parts throughout the several views and in which:

Fig. 4 is a longitudinal sectional view through the improved electric fan as illustrated in Fig. 3, the section being taken substantially on the line 4—4 of Fig. 3;

Fig. 5 is a transverse sectional view taken substantially on the section indicating lines 5—5 of Fig. 4, the blades of the fan being omitted;

Fig. 6 is a detached perspective view of a portion of the rotor illustrating a step in the manufacture of the latter;

Fig. 7 is a plan view of one of the stator stampings or laminae;

Fig. 8 is a perspective view of one of the shading coils employed in the fan motor;

Figure 1:
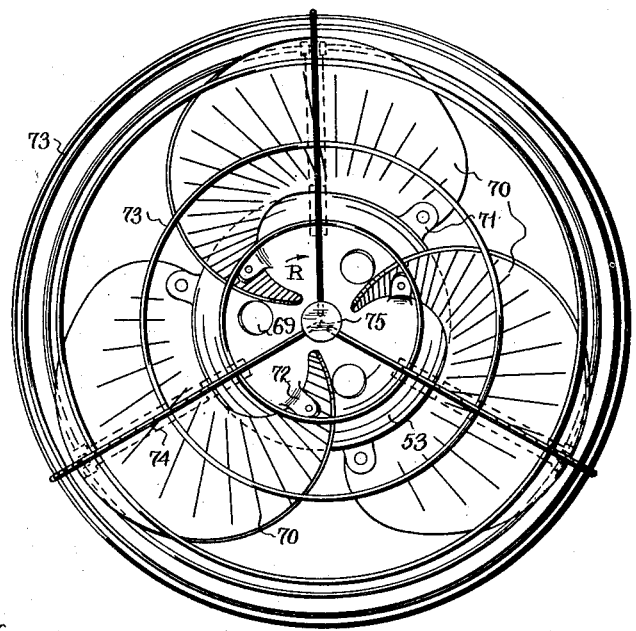
Fig. 1 is a front elevational view of the improved electric fan of this invention provided with a guard for the fan blades.

The improved fan of this invention is so designed that it has no supporting base and no external connecting wires. Instead, the novel fan is provided with a projecting portion adapted to be screwed into a standard, screw-type, electrical socket, such as a lamp socket, which provides both the support for the fan and the electrical connections thereto. Such a fan is especially useful for circulating air within a room or other enclosed or partially enclosed space and, while not limited thereto, is advantageously employed in a bracket or "pin-up" type lamp mounted upon the wall of the room in which the air is to be circulated. When so mounted, the fan has its axis extending substantially vertical and will circulate the air either from the floor to the ceiling or conversely depending upon whether the lamp is mounted in an upright or inverted position. When thus mounted in a bracket or "pin-up" type lamp, the fan is closely adjacent the wall of the space in which the air is to be circulated and is at an elevation such as to be out of the way and does not create noticeable drafts. Moreover, when so mounted the fan is not likely to be accidentally encountered by individuals or objects and hence no guard need be employed for the blades. When the fan is mounted in a more accessible location a readily removable guard is preferably provided to prevent encounter of objects or individuals with the blades.

The fan of this invention employs an alternating current motor of the induction type having an inner stationary field portion or stator and an outer substantially annular rotor in which is embodied a squirrel cage construction for cooperation with the stationary field, the fan blades being directly connected to the outer surface of the rotor.

The stator or stationary field of the motor, generally designated 10, comprises a laminated core 11 formed by a plurality of laminae 12, one of which is shown in Fig. 7 as having four portions 13 extending radially at right angles to each other and constituting the poles of the stator. Each of the poles 13 is provided with an integral segmental portion 14 constituting a pole piece, the ends of the several pole pieces being separated from each other by air gaps. Each of the pole pieces is provided with an annularly extending slot 15 and the under side of the pole piece, in the portion thereof adjacent the slots 15, is recessed as indicated at 16 for a purpose hereinafter described.

The laminae 12 are assembled with their poles and pole pieces in alignment to provide a core of the desired size and the laminae are then secured together by rivets or the like extending through suitable openings 17 in the laminae. The alternate or two opposite poles of the assembled core 11 are then provided with field coils 18 and 19, the other poles being unwound. The two coils are so wound as to form similar magnetic poles in their corresponding pole tips or pieces, with the result that the pole pieces of the two unwound poles will in the same instant be of the opposite polarity. That is to say, at a given instant north poles will be formed on the pole pieces of the wound poles and south poles will be found on the pole pieces of the unwound poles and, on the opposite phase, the polarities will be reversed.

Prior to placing the coils 18 and 19 upon the stator 11 the pole pieces 14 are each provided with shading coils 20. These shading coils are preferably substantially rectangular copper members, shaped substantially as shown in Fig. 8, and bent to fit within the notches 15 and recesses 16 of the pole pieces in the manner shown in Fig. 5. Such shading coils are provided for the well-known purpose of making the motor self starting. After the shading coils 20 and the field coils 18 and 19 are in place, steel slugs or inserts 21 are inserted between adjacent ends of the pole pieces 14 to provide magnetic shunts thereby enhancing smoothness of operation. While the stator or field of the motor has been shown as formed with four poles it may be constructed of more than four poles as, for example, any desired multiple of two, such as 4, 6, 8 etc. In all cases, however, only the alternate poles are provided with field coils.

The field or core thus assembled is then provided with a hollow stationary member or shaft 22 which has a reduced portion adapted to extend through a central opening 23 in the laminae of the core with a force fit, the core being positioned against an integral shoulder 24 upon the stationary shaft as shown in Fig. 4. The member or shaft 22 also has an integral, substantially dish-shaped flange 25 from the outer face of which extends an integral sleeve portion 26. The shaft 22, flange 25 and sleeve 26 are preferably formed of aluminum by casting although it will be apparent that they may be constructed from other suitable materials and by procedures other than casting if desired. The wall uniting the flange 25 and the sleeve portion 26 with the shaft portion 22 is provided with two spaced openings through which are passed the leads 27 and 28 for the field coils.

A substantially cylindrical, hollow insulating connector member, generally designated 29, is inserted within the sleeve portion 26 with the inner end of the member 29 bearing against an integral shoulder provided on the interior of the sleeve portion 26, the member 29 having an outwardly extending flange portion 30 for cooperation with the outer edge of the sleeve 26. This connector member 29 is held within the sleeve 26 by means of a set screw 31 or the like which prevents withdrawal of the member 29 from the sleeve and relative rotation therebetween.

Figures 9, 10:
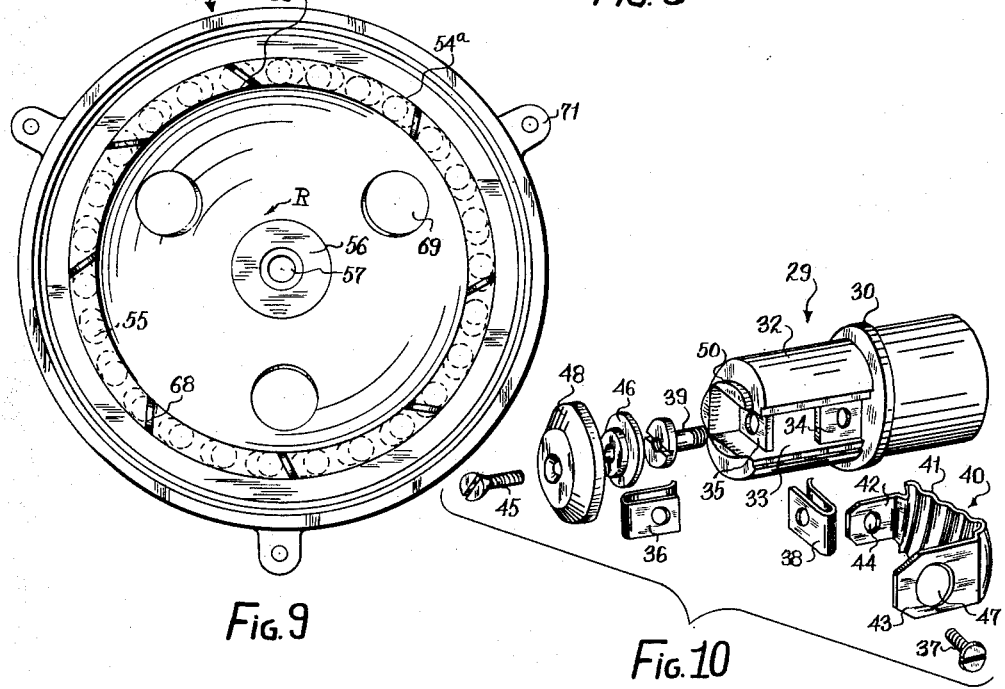
Fig. 9 is an end view of the completed rotor per se prior to the assembly of the fan blades thereon; and, Fig. 10 is an exploded perspective view of the novel means which is secured to the shaft of the motor field or stator for enabling the fan to be connected in a standard lamp socket to effect support of, and the electrical connections for, the fan.

Extending outwardly from the flange or shoulder 30 of the member 29 is an integral, substantially cylindrical portion 32. One of the side walls of this cylindrical portion 32 is cut away, as indicated at 33 in Fig. 10, to provide an opening into the hollow interior of the member 29. Within this recess 33, and extending outwardly from the flange 30 substantially parallel with the axis of the member 29, is an integral rectangular wall 34. Adjacent the outer end of the recess 33, but inwardly with respect to the outer face of the portion 32, is an integral laterally extending wall 35. A substantially U-shaped metallic clip 36 is slipped over the wall 34, this clip and the wall 34 having aligned openings therethrough for receiving a screw 37, the opening in the inner arm of the clip 36 being threaded or provided with a projection for cooperation with the threads of the screw 37 to act as a nut for the latter. A similar clip 38 is provided upon the wall 35 which has an opening therethrough for cooperation with corresponding aligned openings in the clip 38, the latter also serving as a nut for a hollow screw 39.

In order to enable the portion 32 of the member 29 to be screwed into a standard screw-type electrical socket for effecting support of the electric fan and interconnection of the field coils 18 and 19 thereof with a source of electrical power, the portion 32 of member 29 is provided a segmental metallic member, generally designated 40. This segmental member has an intermediate portion 41 formed with partial threads having a pitch such as to cooperate with the threads in a standard socket. These partial threads may be formed by deforming the said intermediate portion 41 of the member 40. Extending transversely from the intermediate portion 41 of member 40 are integral lugs 42 and 43, the lug 42 having a size such as to fit within that portion of the recess 33 which is adjacent the outer face of the wall 34.

In assembling the parts just described with the member 29, the clip 36 is first inserted over the wall 34 and the lug 42 of the segmental member 40 is then placed in contact with the outer face of the clip 34 with the opening 44 through this lug in alignment with the openings of the clip 36 and the wall 34. The bared end of the lead or connector 28 is looped about the screw 37 and the latter is inserted through the openings in the lug 42, clip 36 and wall 34 and is screwed into position as shown in Fig. 4 thereby retaining the lead 28, lug 42 and clip 36 in firm engagement with good electrical connection therebetween. The clip 38 is next placed over the wall 35 and the bared end of the connector or lead 27 is looped about the screw 39 which is then inserted through the openings in the clip 38 and wall 35 and tightly screwed into position as shown in Fig. 4. The screw 39 has a central bore extending therethrough the inner end of which is threaded for receiving a second screw 45.

The segmental member 40 is next bent about the portion thereof between the lug 42 and the intermediate portion 41 to dispose the said intermediate portion substantially parallel with the axis of the member 29 and with the longitudinal edges of the portion 41 in overlapping relationship with respect to the edges of the recess 33. The lug 43 of the member 40 is then disposed substantially transversely of the central opening through the member 29 as shown in Fig. 4. Prior to this bending of the member 40 a shouldered insulating washer 46 is inserted in the opening 47 of the lug 43 so that, when the member 40 is bent to the position as shown in Fig. 4, the washer 46 contacts the head of the screw 39 and provides insulation between the said screw and the lug 43. An insulating washer 48 is then placed over the outer surface of the lug 43 and the screw 45 is inserted through aligned openings in the washers 48, 46 and the opening 47 of lug 43, the screw being threaded into the interior of the screw 39 which serves as a nut for the screw 45. The completed assembly is shown in Fig. 4 from which it will be seen that the washer 48 has an annular recess on its inner face for cooperation with a shoulder 49 on the member 40 and with segmental shoulders 50 on the outer end face of the portion 32 of member 29. The washer 48 also has a central recess for receiving the end portion of the washer 46. Hence, the segmental member 40 is firmly held in engagement with the portion 32 of the member 29 and cannot be displaced either radially or rotatively with respect thereto.

In accordance with the construction just illustrated and described the portion 32 of the member 29 is provided with threads on only a portion of its circumference, the threaded portion being formed by the member 40. This is sufficient to enable the fan to be properly supported and electrically connected within a standard screw-type electrical socket since the portion 32 of the member 29, which has no threads, is of a diameter to engage the outer surfaces of the threaded interior of the socket. The partial threads on the member 40 permit the fan to be inserted into the socket by threading thereof in the same manner in which a lamp bulb or plug is inserted into the socket, electrical connection to the motor being provided through the segmental member 40 and the screw 45, the latter constituting a contact member for cooperation with the central contact in the socket in the well-known manner. If desired, the portion 32 of the member 29 may have a slightly larger diameter and be provided with threads which are continuations of the partial threads of the member 40 for cooperation with the threads in a lamp socket. In the present preferred construction, however, the exterior surface of the portion 32 is unthreaded as illustrated.

The construction just described is particularly advantageous because it provides a satisfactory means for supporting the fan and electrically connecting it with a source of electrical current while at the same time effecting important savings in the cost of construction. These savings are due to the fact that the member 29 may be constructed of fibre, plastic, or other suitable insulating material and may be cast or molded in one piece in a form similar to that shown in Fig. 10. Moreover, the segmental member 40 may be constructed with fewer operations and with less material than is possible when employing a conventional brass ring. It should also be noted that by this construction the number of parts and costs of assembling are materially reduced over conventional constructions while at the same time the leads for the field coils of the motor are entirely concealed. This concealing of the leads provides a pleasing appearance and eliminates the need for replacement thereof as is frequently necessary in conventional constructions where the current supply wires for the fan motor are exposed. The construction is further simplified by the fact that the clips 36 and 38 may be purchased in the form shown.

Surrounding the stationary, centrally disposed field 19 is a rotor generally designated 51. This rotor includes a plurality of annular laminae 52 having a series of equally spaced openings 52a near their inner peripheries. The laminae are arranged in superposed relationship as shown in Fig. 6 and are rotatably displaced slightly with respect to each other so that the openings 52a form passageways which are somewhat inclined with respect to the common axis of the laminae. The laminae thus arranged are inserted into a suitable mold and a substantially dome shaped shell 53 is cast thereabout. A portion of the material of this shell flows, during the casting thereof, through the openings 52a of the laminae and unites on both sides of the outer two laminae to form spaced annular rings 54a and 54b interconnected by bar-like portions 55 formed by the material of the shell which flows through the openings 52a. There is thus formed a squirrel cage type rotor as an integral part of the shell. While the invention is not limited thereto, it has been found advantageous to employ aluminum or an aluminum alloy for the material from which the shell 53 is cast. The previously mentioned slight rotative displacement of the laminae 51 may be effected in any desirable manner and, in accordance with one procedure, the said laminae are displaced and are secured together in their displaced positions by means of rivets 56 or the like prior to their insertion in the mold employed for casting the shell thereabout. This facilitates the handling of the laminae since it forms them into a single unitary member.

The forward portion or apex of the shell 53 has a central, interiorly disposed boss 56 formed integrally therewith which boss has a bore 57 extending therethrough. A shaft 58 having a knurled end 59 is provided in an enlarged portion of the bore 57, this shaft being either driven into the said enlarged portion of the bore after the shell is cast or inserted in the mold with the boss 56 cast thereabout during the casting operation as may be desired. The shaft 58 is journalled within the hollow interior of the stationary shaft or member 22 by bushings 60 and 61 adjacent the ends of the bore through the said stationary shaft, a thrust washer 62 being interposed between the boss 56 and the adjacent end of the stationary shaft 22. The outer end of the shaft 58 extends into a counterbored portion in the stationary shaft 22 and is provided with an annular groove adjacent its end in which an accurately formed snap ring 63 is mounted to retain the shaft in place against axial displacement, the ring cooperating with the bottom of the counterbored portion in shaft 22 for this purpose. The complete rotor comprising the shell and the integral squirrel cage are thus assembled with the field 10 prior to the mounting of the member 29 in the portion 26 of the hollow shaft or member 22 and, when so assembled, the squirrel cage portion of the rotor is in transverse alignment with the field 10 as is shown in Fig. 4.

The shaft 58 is provided with a longitudinally extending bore 64 and a transversely extending bore 65, the latter providing communication of the bore 64 with the space between the bushings 60 and 61. The bore 64 is in communication with the bore 57 in the boss 56 thus providing a passageway through which oil may be introduced for lubricating the shaft 56 and bushings 60, 61. Sufficient oil will ordinarily work past the bushing 61 to also lubricate the ring 63 but if desired the bore 64 may be extended entirely through the shaft 58 for this purpose. The outer end of the counterbore in the stationary shaft or member 22 is closed by a plug 66 to prevent any oil which enters the counterbore from draining into the member 29 which is placed within the sleeve portion 26 after the rotor has been assembled with the field as just described. A suitable plug or cap, not shown, is also preferably provided for the outer end of the bore 57.

As shown in Fig. 4, the flange portion 25 has a forwardly projecting rim which is in substantial alignment with the cylindrical portion of the shell 53 of the rotor so that when the rotor is assembled with the field the latter is substantially and entirely enclosed except for a relatively small annular air space 67. The ring 54a of the rotor is provided with spaced projections or vanes 68 which extend angularly with respect to tangents of the ring portion 54a and are closely adjacent the air space 67 in the assembled fan. These projections or vanes, which are preferably cast integrally with the rotor 50, serve to move air from the exterior of the assembly through the air space 67 into and through the interior of the rotor 51, the air being exhausted through suitable openings 69 provided in the forward end of the shell portion 53 of the rotor. This circulating air serves to cool the motor and to prevent an excessive temperature rise therein.

Figure 2:
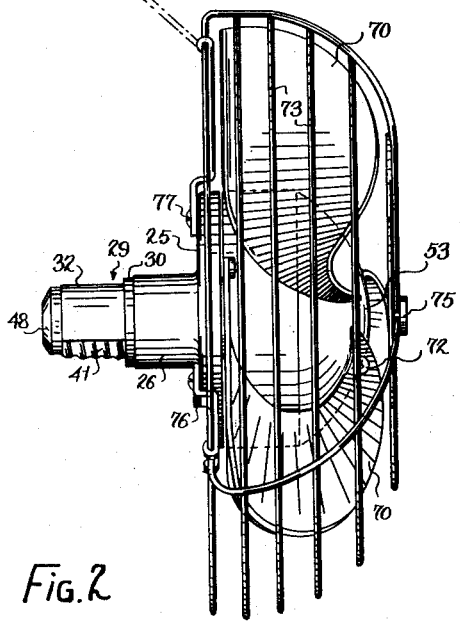
Fig. 2 is a side elevational view of the electric fan illustrated in Fig. 1.
Figure 3:
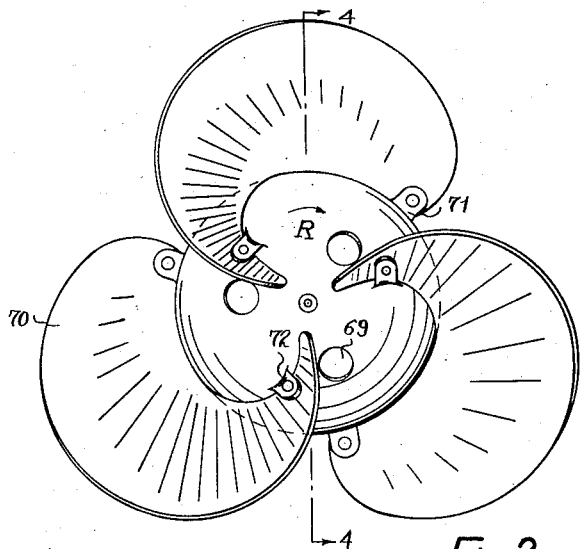
Fig. 3 is a front elevational view of the improved electric fan with the fan blade guard removed.

The exterior of the shell of the rotor 51 is preferably provided with a plurality of fan blades 70 of suitable number and configuration. These blades are attached to the shell by means of screws or rivets secured in spaced projecting lugs such as 71 and 72 which are preferably formed integrally upon the shell during the casting operation thereof. The blades 70 may be formed of any desirable material and may have any suitable shape, the present construction employing metal blades shaped substantially as shown in Figs. 1, 2 and 3. Since it is contemplated that the fan will generally be employed in a bracket type lamp or the like, and hence will be out of the way, no guard for the blades need be provided. However, if the fan is to be employed at places where contact with the blades might occur, the blades may be formed of rubber or a suitable guard placed thereabout. While the fan blades 70 have been illustrated and described as being separate members attached to the rotor, it will be apparent that the blades may be cast integrally with the rotor if desired.

Figs. 1 and 2 show the electric fan of this invention provided with one suitable type guard. The illustrated guard comprises a plurality of concentric ring members 73 secured together in spaced relationship by curved radially extending members 74, the diameters of the various ring members and the curvatures of the radial members being such that the guard has a shape corresponding substantially with the shape of the space swept by the fan blades. Preferably, the ring members 73 and the radial members 74 are formed of wires and are secured together at their points of intersection by welding, brazing or the like, the forward ends of the members 74 being secured to a small disk or button 75. The guard is removably secured to the stationary flange 25 of the fan by a plurality of radially extending bracket members 76. As shown, three such members 76, spaced approximately 120° apart, are employed but it will be apparent that a greater number of such members may be utilized if desired. The outer ends of each of these bracket members 76 is preferably bifurcated and bent over the rearmost ring 73 of the guard to provide a hinge between the said ring and each bracket member. Each member 76 is preferably so located that the rear end of a member 74 is received within the opening provided by the bifurcation of the member 76 thereby preventing rotative displacement of the members 76 when the guard is not in position on the fan. The inner ends of the bracket members 76 are each provided with holes or slots through which mounting screws 77 or other fastening means are inserted for securing the brackets to the flange 25.

A guard constructed in this manner may be readily applied to the electric fan by swinging each of the bracket members 76 to its outer position as indicated for one of the members by the dot-dash lines in Fig. 2. The guard may then be placed over the fan blades, the bracket members 76 moved to the positions indicated in solid lines in Fig. 2, and the screws or other fastening means 77 then inserted through the bracket members and into suitable tapped holes in the flange member 25.

While one type of complete guard has been shown and described in detail for the fan it will be apparent that other types of complete guards or partial guards may be employed, depending upon the use to which the fan is to be placed. For example, if the fan is to be located with its axis vertical and the fan blades uppermost, and it is to be in a relatively high location so that only the backs of the fan blades might be contacted by an object or an individual, then a suitable guard or shield need be provided only for the back of the blades and such a guard could take the form of a suitably shaped wire member or perforate annulus attached to the flange member 25 of the fan. Conversely, if the fan is to be used with its axis vertical and with the fan blades lowermost so that only the fronts of the blades might be contacted a guard similar to that illustrated in Figs. 1 and 2 may be employed but with certain of the ring members 73 omitted such as those of larger diameter forming the sides of the guard. Furthermore, the guard member, whether a complete guard or a partial guard, may be formed of a plurality of segments or may be otherwise constructed as will be readily apparent to those skilled in the art.

It is believed that the operation of the improved fan will now be readily apparent. To briefly summarize, the fan when assembled comprises an induction type motor having a stationary central field with a surrounding squirrel cage type rotor, the said rotor having an integral shell portion forming the major portion of an enclosure for the motor and having fan blades on the exterior thereof. The stationary field of the motor is provided with a hollow member or shaft to which is attached the supporting and connector member 29 which enables the fan to be supported and electrically connected to a source of alternating current by simply screwing the member 29 into a standard, screw-type, electrical socket in the same manner that a lamp bulb is inserted therein. When electrical current is applied to the socket the motor, which is self-starting, operates in the well-known manner to revolve the rotor 51 in the direction indicated by the arrow R thereby producing a movement of air forwardly with respect to the fan assembly. The revolution of the rotor also causes the vanes 68 to circulate air therethrough thereby cooling the motor, this circulation being further assisted by the movement of the air induced by the fan blades 70.

It will thus be apparent that the fan of this invention is simple and inexpensive in construction, yet efficient and reliable in operation and has no external leads or electrical connections in the form of exposed wires to become frayed or damaged. Various adaptations and modifications of the improved electrical fan will be readily apparent to those skilled in the art and therefore the invention is not to be considered as limited to the exact construction illustrated and described but only as required by the spirit and scope of the appended claims.

Having thus described our invention, we claim:

1. In an electric motor for a fan, said motor comprising a core structure including a sleeve at one end for receiving a support and a tubular portion at the other end of said structure coaxially aligned with said sleeve; a stator attached to and surrounding said tubular portion; a rotor comprising a dome shape shell having an apex and closing said other end of said structure and surrounding the periphery of said stator, said rotor having a bearing shaft extending into said tubular portion and journalled therein, said core structure having a radially extending flange intermediate said sleeve and the stator, said flange substantially closing the open side of said shell; fan blades attached to said shell, said blades extending along the shell from adjacent the periphery of said shell toward the apex thereof; and conductor wires leading from said stator and extending through said sleeve.

2. In an electric motor for a fan, said motor comprising, a core structure having a sleeve at one end adapted to be connected to a support; a stator attached to and surrounding a portion of said core; a rotor journalled on said core, said rotor comprising a dome shaped shell having laminae carried on the interior thereof and having fan blades on the exterior thereof, said shell closing the other end of said core and extending around the periphery of the stator, said core structure having a flange extending radially therefrom adjacent said stator and being adapted to substantially close the open side of said dome shaped shell; and guard means adapted to surround the blades carried by said rotor and being detachably connected to said flange.

OTTO G. HILDEBRAND.
MARION W. HUMPHREYS.

REFERENCES CITED

The following references are of record in the file of this patent:

UNITED STATES PATENTS

| Number | Name | Date |
|---|---|---|
| 521,799 | Lee | June 26, 1894 |
| 785,004 | Klemm et al. | Mar. 14, 1905 |
| 1,048,001 | Smith | Dec. 24, 1912 |
| 1,162,354 | Hart | Nov. 30, 1915 |
| 1,219,562 | Kouyoumjian | Mar. 20, 1917 |
| 1,263,442 | L'Homadieu et al. | Apr. 23, 1918 |
| 2,048,421 | Ballentine | July 21, 1936 |
| 2,056,547 | Weber | Oct. 6, 1936 |
| 2,186,674 | Hildebrand et al. | Jan. 9, 1940 |
| 2,434,130 | Turner | Jan. 6, 1948 |

FOREIGN PATENTS

| Number | Country | Date |
|---|---|---|
| 456,372 | Germany | Feb. 2, 1928 |